Jan. 24, 1961
J. W. HOLTER ET AL
2,969,066
DEVICE FOR DRAINING VENTRICULAR FLUID
IN CASES OF HYDROCEPHALUS
Filed Oct. 2, 1956
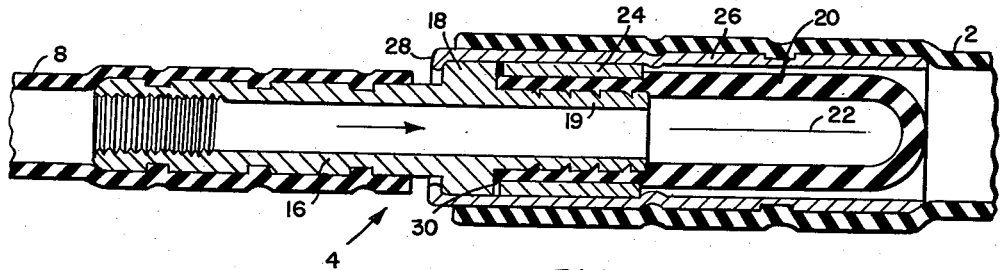
FIG. 2.
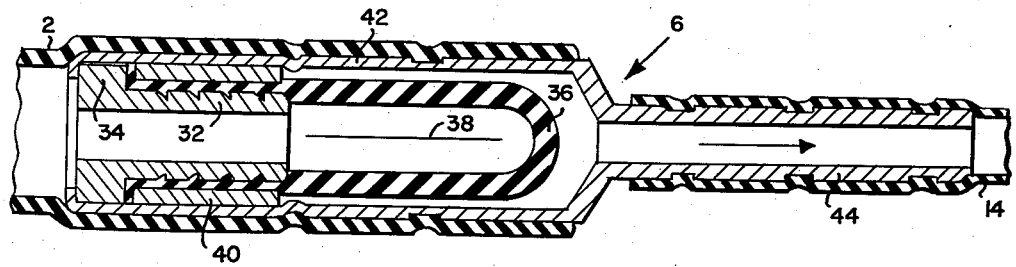
FIG. 3.
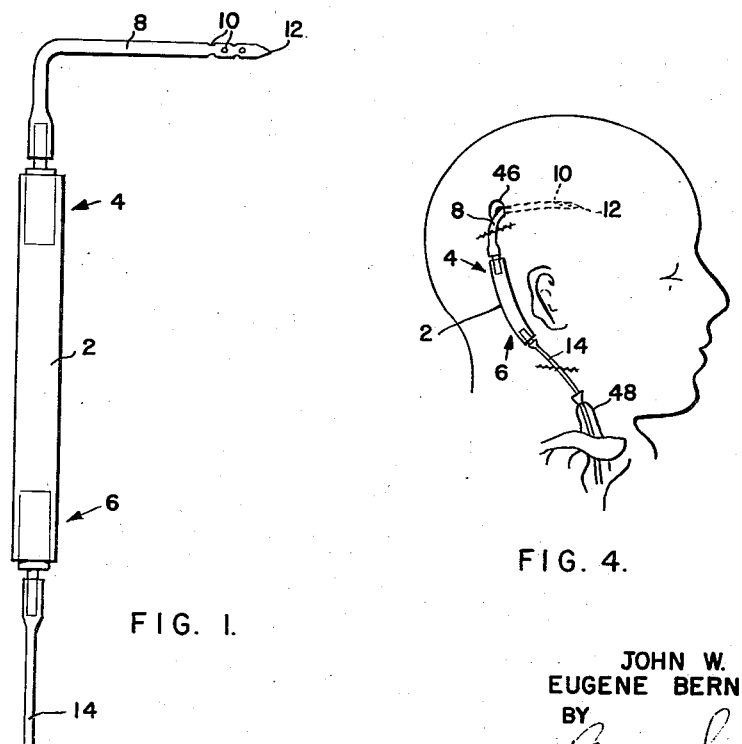
FIG. 1.
FIG. 4.
INVENTORS
JOHN W. HOLTER &
EUGENE BERNARD SPITZ
BY
ATTORNEYS

2,969,066

DEVICE FOR DRAINING VENTRICULAR FLUID IN CASES OF HYDROCEPHALUS

John W. Holter, Bridgeport, and Eugene Bernard Spitz, Swarthmore, Pa., assignors to The Holter Company, Bridgeport, Pa., a corporation of Pennsylvania Filed Oct. 2, 1956, Ser. No. 613,549

5 Claims. (Cl. 128—350)

This invention relates to a surgical device particularly designed for the draining of cerebrospinal fluid to the jugular vein in cases of hydrocephalus.

In the case of communicating or obstructive hydrocephalus, the delivery of cerebrospinal fluid to the venous system that occurs under normal physiological conditions can, in theory, be established by providing a direct connection by tube between lateral ventricle and jugular vein. Although the ventricular pressure exceeds the mean jugular venous pressure, such system will, in practice, become blocked by blood clot when venous pressure is temporarily elevated by coughing or straining.

One of the objects of the present invention is the provision of a device which will permit draining of the ventricular fluid to the jugular vein, either supplementing or replacing normal body function, the device incorporating check valves for the prevention of reverse flow and providing for a pumping operation for insuring that the device is functioning properly. In particular, check valves are provided which must permit forward flow under a very slight pressure gradient but which must immediately and completely close off any reverse flow. The device must also retain dimensional and elastic stability during autoclaving at elevated temperature and pressure such as 270° F. at 25 lbs. per square inch steam pressure. Other requirements which are satisfied in accordance with the invention will be hereafter described.

The following and other objects of the invention particularly relating to details of construction and operation will become apparent from the following description read in conjunction with the accompanying drawings, in which:

Figure 1 is an elevation showing the complete device;

Figure 2 is an enlarged section showing the inlet valve of the device;

Figure 3 is an enlarged section showing the outlet valve of the device; and

Figure 4 is a diagram showing the application of the device to a patient.

The device comprises a tube 2 desirably of silicone rubber, though it may be of gum rubber. This tube which may be of the order of three inches in length is closed at its upper end by a check valve indicated generally at 4 and at its lower end by a second check valve indicated generally at 6. To the upper check valve assembly there is affixed a tube 8 which may be of silicone rubber and which is provided with openings 10 for the reception of the cerebrospinal fluid, the end of the tube being desirably closed as indicated at 12.

Secured to the lower valve assembly is a tube 14 which is desirably of polyethylene and is arranged to enter and be secured within the jugular vein.

Reference may now be made to Figure 2 which shows the details of the upper valve 4. A tubular member 16 of stainless steel or other metal which will not be corroded by body fluids is provided with a flange 18 and with an extension 19 embraced by the open end of a thimble 20 desirably of silicone rubber which is provided with a slit 22 such as may be made by a sharp blade and which functions as the actual valve. A band 24 of stainless steel surrounds the open end of the thimble 20 and about this is a stainless steel sleeve 26 which is secured to the flange 18 by rolling as at 28. The thimble 20 is desirably cast and as an incident to casting there will be a flash 30 of its material extending radially outwardly. Use of this flash is made to secure a good seal between the flange 18 and the band 24, the excess portions of the flash being cut away by the sleeve 26 as it is placed in position over the flange 18 and band 24. The stem of the member 16 and the sleeve 26 are both corrugated to secure well the tubes 8 and 2 which may be bound thereon by tying with silk thread.

The outlet valve shown in Figure 3 is generally similar to the inlet valve, comprising a member 32 provided with a flange 34 and carrying the thimble 36 which is slitted at 38 in the same fashion as the thimble 20. A band 40 secures this thimble on the member 32 and the interposed flash provides a good gasket closure. A sleeve 42 encloses the entire assembly just described, being crimped over the flange 34. The sleeve 42 is extended at 44 to receive the tube 14. The metallic parts in this outlet valve assembly are also of stainless steel and corrugation is provided for the securing of the tube.

The entire assembly is of quite small diameter. The thimbles have external diameters of the order of one-eighth inch and wall thickness of approximately 0.020 inch, the slits 22 and 38 being about three-sixteenth inch in length. Other dimensions are in the proportions shown in Figures 2 and 3, the maximum external diameter of the assembly being about three-sixteenth inch. Under these conditions both valves open to permit forward flow under a pressure gradient between the tubes 8 and 14 of the order of thirty millimeters of water, opening occurring by the dilation of the thimbles 20 and 36 to open the slits 22 and 38. On the other hand, reverse flow is completely stopped against any pressure gradient which may be expected during use, closing taking place due to the resiliency of the thimbles when there is no pressure gradient and remaining closed until the forward pressure gradient occurs. In the forward direction the valves will pass small particles of tissue which may occur in the ventricular fluid.

The use of the device is illustrated in Figure 4. The device is inserted beneath the skin with the tube 8 extending through an opening 46 in the skull. The device below the tube 8 is threaded under the skin and by means of a lower incision the tube 14 is inserted into and secured in the jugular vein 48. By reason of the materials used the entire device may be sterilized by autoclaving at elevated temperature and pressure.

The device once inserted permanently remains in the patient, to be replaced only if there is complete recovery by reason of proper body function or if some maloperation occurs which may require replacement. Hence it is important that the materials used be of types, as indicated above, which are inert to body fluids.

In the use of the device, proper function may be determined by pressing upon the skin covering the tube 2. If pressure is noted indicated that the outlet valve may have become closed, the siutation may generally be rectified by producing a pumping action by pressure and release on the tube 2. This pumping action results from the displacement of liquid by pressure through the outlet valve and refilling of the tube upon release of pressure through the inlet valve. In the event that the inlet valve should be clogged that fact will be eident since the tube 2 will no expand upon release of pressure. Actually the valves are highly reliable and, as stated, pass tissue particles which might be in the fluid. It will be recognized that certain structural details may be changed without

What is claimed is:

1. A device for the draining of ventricular fluid in cases of hydrocephalus comprising an elastic tube, inlet and outlet valves in the ends thereof completely closing said tube, each of said valves comprising a thin walled tubular member of elastic material provided with a slit arranged to be opened by excess of pressure in the interior of the member over the exterior thereto and to close upon release of said pressure excess, a pair of tubes, means connecting one of said pair of tubes to supply a flow of fluid to the upstream side of said inlet valve, and means connecting the other of said pair of tubes to receive a flow of fluid from the downstream side of said outlet valve, said valves being arranged to open upon existence of normal pressure gradient between the last mentioned tubes of the order of thirty millimeters of water.

2. A device according to claim 1 in which each tubular member is in the form of a thimble.

3. A device according to claim 1 in which each tubular member is enclosed in a metallic sleeve.

4. A device according to claim 1 in which each of said tubular members has a flange provided by flash and in which mounting means for each tubular member clamps said flange.

5. A device according to claim 2 in which each of said tubular members has a flange provided by flash and in which mounting means for each tubular member clamps said flange.

References Cited in the file of this patent

UNITED STATES PATENTS

| | | |
|---|---|---|
| 528,701 | Taggert | Nov. 6, 1894 |
| 788,176 | Traves | Apr. 25, 1905 |
| 926,197 | Kim | June 29, 1909 |
| 1,215,475 | Brokaw | Feb. 13, 1917 |
| 2,347,988 | Burke | May 2, 1944 |

FOREIGN PATENTS

| | | |
|---|---|---|
| 825,924 | Germany | Dec. 27, 1951 |